(12) United States Patent
Fraser

(10) Patent No.: US 7,345,013 B2
(45) Date of Patent: Mar. 18, 2008

(54) POLYMER CROSSLINKING SYSTEM COMPRISING SOLUBLE ZR(IV), CARBONATE AND BICARBONATE IONS

(75) Inventor: Greig Fraser, Westhill (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 519 days.

(21) Appl. No.: 11/064,549

(22) Filed: Feb. 23, 2005

(65) Prior Publication Data

US 2006/0189709 A1   Aug. 24, 2006

(51) Int. Cl.
*E21B 43/27* (2006.01)
*C09K 8/66* (2006.01)
*C09K 8/68* (2006.01)

(52) U.S. Cl. ............. 507/271; 166/308.1; 166/308.3; 166/308.5; 507/211; 507/213; 507/214

(58) Field of Classification Search ............. 166/308.3, 166/308.5, 308.1; 507/271, 213, 214, 211, 507/209, 203
See application file for complete search history.

(56) References Cited

U.S. PATENT DOCUMENTS

| | | | |
|---|---|---|---|
| 4,799,550 A | 1/1989 | Harris et al. | 166/300 |
| 5,614,475 A | 3/1997 | Moorhouse et al. | 507/273 |
| 5,697,444 A | 12/1997 | Moorhouse et al. | 166/308 |
| 5,697,555 A | 12/1997 | Robinson | 239/219 |
| 5,950,729 A | 9/1999 | Dawson et al. | 166/283 |
| 5,972,850 A | 10/1999 | Nimerick | 507/211 |
| 6,737,386 B1 | 5/2004 | Moorhouse et al. | 507/211 |
| 2006/0046937 A1* | 3/2006 | Fu et al. | 507/131 |

* cited by examiner

*Primary Examiner*—Randy Gulakowski
*Assistant Examiner*—Timothy J. Kugel
(74) *Attorney, Agent, or Firm*—David Cate; Darla Fonseca; Robin Nava

(57) ABSTRACT

A composition useful for making gelled fluids by crosslinking hydratable polymers is an aqueous solution of zirconium complexed with carbonate and bicarbonate as the only multidentate ligands complexed with zirconium. The composition also provides pH modifying capability and the crosslinking is delayed, so that the single composition replaces several liquid additives previously necessary for generation of fluids used, for example, in hydraulic fracturing.

20 Claims, 3 Drawing Sheets

US 7,345,013 B2

POLYMER CROSSLINKING SYSTEM COMPRISING SOLUBLE ZR(IV), CARBONATE AND BICARBONATE IONS

TECHNICAL FIELD OF THE INVENTION

The invention relates to gelled polymers for thickening water, more particularly to the use of such materials in oilfield operations, and most particularly to a crosslinker system and method of use that reduces costs and simplifies operations.

BACKGROUND OF THE INVENTION

Aqueous fluids that have been thickened, or viscosified, are useful in many industries, for example in the oilfield. Oilfield operations that use such fluids include, for example, enhanced oil recovery and well stimulation, for example hydraulic fracturing, gravel packing, and the combination of these two called frac-n-pack. Such fluids are commonly generated by incorporating, or forming, gels in them, for example viscoelastic surfactant gels or polymer gels. Polymer gels are typically formed by dissolving or hydrating a suitable polymer in water. Often, these aqueous fluids are further thickened or viscosified by crosslinking the polymers, for example with organic or metal crosslinkers. Typical metal crosslinkers include boron, titanium, and zirconium. Zirconium crosslinkers have been described, for example, in U.S. Pat. Nos. 5,614,475; 5,972,850; 5,950,729; 5,697,555; 4,799,550; 5,697,444 and 6,737,386.

For use in stimulation, valuable properties for fluids containing crosslinked polymer gels include low cost, simplicity of preparation, the ability to delay the gellation for a predetermined time (to minimize hydraulic horsepower required to pump the fluid), and thermal stability. In practice, moving toward those requirements with zirconium crosslinkers typically has meant that the crosslinking system had one or more of a known group of ligands on the zirconium (for example triethanolamine and/or lactate) in order to delay the crosslinking, and a pH modifier in order to increase the stability. Incorporation of such ligands increases the cost of the zirconium compounds. The amount (weight) of these ligands necessary for delay limits the zirconium concentration that can be provided in a crosslinker concentrate, and this plus potential competition for the zirconium between these ligands and pH modifier components means that pH modifiers are typically provided separately. Sometimes additional delay agents are also needed. This means that at least two additive streams are necessary just for the crosslinking and that the volume of crosslinker additive that must be used is large. These factors add to the complexity and cost of the operation.

There is a need for a crosslinking system that provides a high concentration of zirconium and a pH modifier in a single concentrate at reduced cost.

SUMMARY OF THE INVENTION

One embodiment is a fluid composition containing water, carbonate in solution, bicarbonate in solution, and soluble zirconium(IV) having carbonate and bicarbonate as the only carbon-containing multidentate ligands complexed with zirconium. The moles of carbonate plus the moles of bicarbonate is greater than about 4 times the moles of zirconium, for example greater than about 10 times the moles of zirconium, for example greater than about 15 times the moles of zirconium. The mole ratio of bicarbonate to carbonate is from about 1:4 to about 8:1, for example at least about 1:2, for example at least about 2:1. The zirconium content is from about 0.5 weight percent to about 15 weight percent, for example from about 5 weight percent to about 10 weight percent. The mole ratio of carbonate to zirconium is from about 1:1 to about 8:1, for example from about 2:1 to about 4:1. The mole ratio of bicarbonate to zirconium is from about 0.1:1 to about 8:1, for example from about 1:1 to about 4:1.

In another embodiment, the mole ratio of carbonate to zirconium is at least about 3:1 and the mole ratio of bicarbonate to zirconium is at least about 3:1, for example the mole ratio of carbonate to zirconium is at least about 5:1 and the mole ratio of bicarbonate to zirconium is at least about 5:1, for example the mole ratio of carbonate to zirconium is at least about 7:1 and the mole ratio of bicarbonate to zirconium is at least about 7:1.

In yet another embodiment, the ratio of bicarbonate to carbonate is optionally adjusted by the addition of hydroxide. The fluid may also contain an alcohol, for example methanol, ethanol or propanol.

A further embodiment is a method of fracturing a subterranean formation penetrated by a wellbore involving mixing a first fluid containing water and a hydratable polymer crosslinkable with zirconium with a second fluid containing water, carbonate in solution, bicarbonate in solution, and soluble zirconium(IV) having carbonate and bicarbonate as the only carbon-containing ligands complexed with zirconium, and injecting the mixed fluid into the formation.

Yet another embodiment is a method of forming a gelled fluid involving mixing a first fluid containing water and a hydratable polymer crosslinkable with zirconium with a second fluid containing water, carbonate in solution, bicarbonate in solution, and soluble zirconium(IV) having carbonate and bicarbonate as the only carbon-containing ligands complexed with zirconium.

DETAILED DESCRIPTION OF THE INVENTION

Figure 1:
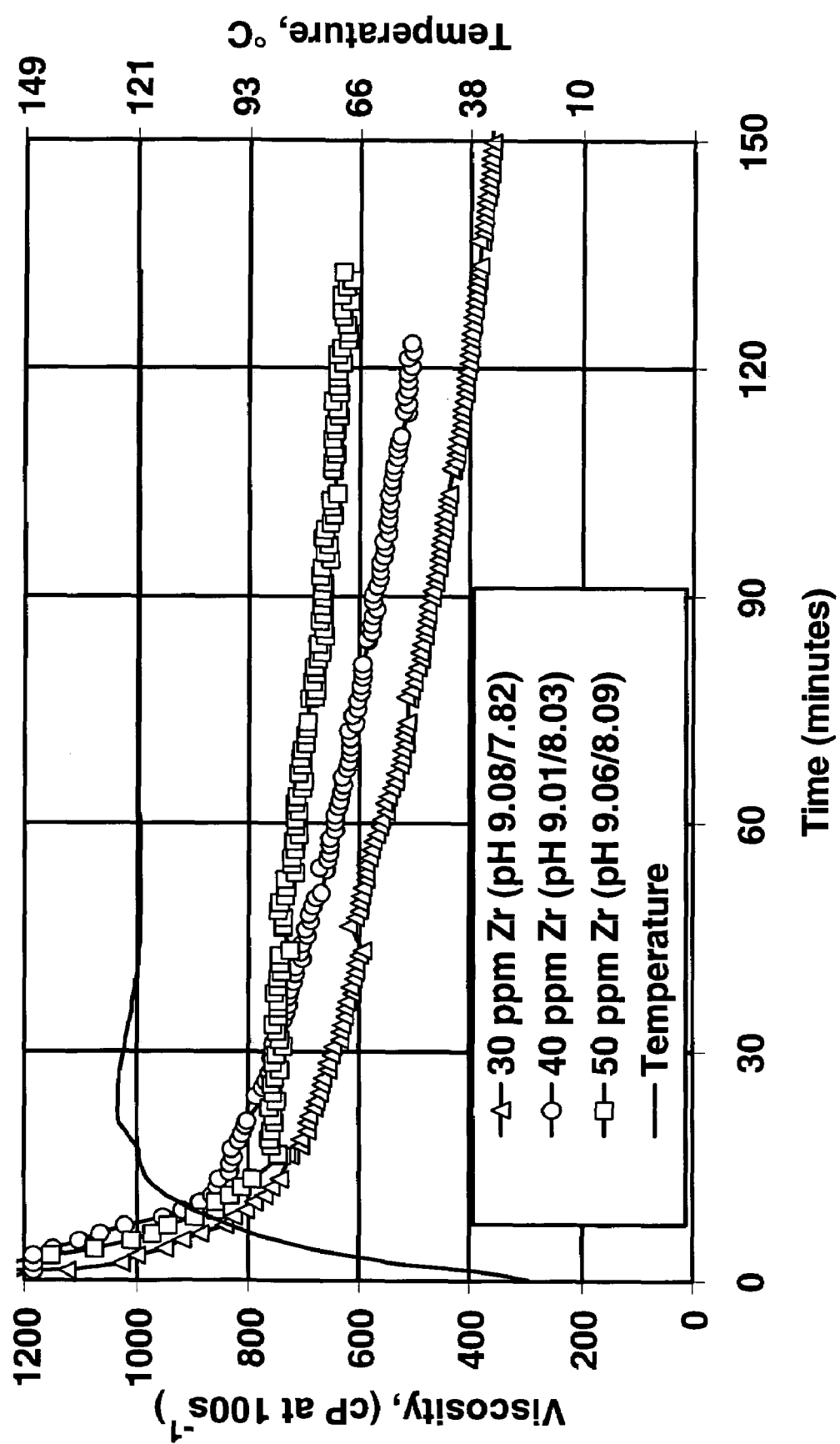
FIG. 1 shows the viscosity as a function of time at 121° C. (250° F.) for experiments in which three concentrations of a crosslinker/pH modifier concentrate were added to a standard linear fluid.

An inexpensive, single-stream, effective crosslinking system (for convenience often called a "concentrate" here) for soluble or hydratable polymers contains a zirconium compound in which the only ligands significant to the crosslinking activity and behavior are carbonate and bicarbonate, the combination of which also serves as a pH modifier, and one component of which, the bicarbonate, further serves as a delay agent. The inclusion of bicarbonate in the formulation of the concentrate is optional; if there is no bicarbonate, the zirconium compound is a zirconium carbonate. Delay may not be needed or wanted in treatments other than stimulation or in very shallow wells. (Commercially, zirconium typically contains small amounts, for example about 2%, of hafnium, and this is meant to be included here in the term zirconium.) The zirconium compound may contain other ions or compounds, for example ammonia (or ammonium), alkali metal cations, halide, and alcohol (or alcoholate), and sulfate, that are much weaker zirconium ligands than carbonate and therefore do not affect the rate or extent to which the zirconium complexes with, and therefore crosslinks, the polymer as much as does carbonate. The zirconium compound may be made from compounds that contain, and therefore the concentrate may also contain, small amounts, for example less than about one mole of ligand per mole of zirconium, of ligands that are known to affect crosslinking in the absence of large amounts of carbonate, for example lactate, triethanolamine, and acetonyl acetate, provided that they do not significantly affect the rate or extent to which the zirconium in the concentrate of the present invention complexes with, and therefore crosslinks, the polymer. Similarly small amounts of these materials from other sources may be included in the concentrate or in the final crosslinked fluid, again provided that they do not significantly affect the rate or extent to which the zirconium in the concentrate of the present invention complexes with, and therefore crosslinks, the polymer. Generally, the sum of the moles of carbonate and bicarbonate in the concentrate exceeds four times the moles of zirconium. The amount of carbonate and bicarbonate in the concentrate is sufficiently high that the other potential ligands, such as lactate and triethanolamine, are not complexed with the zirconium. One skilled in the art will know which ligands are weaker than carbonate and so will not complex with zirconium in the presence of an excess of carbonate. However, it is known that the raw material that is used to prepare zirconium crosslinkers can affect the crosslinking reaction. This effect is expected to be minor in the presence of the excess of carbonate in the present concentrate, but specific preparations should be tested by laboratory experiment before use.

The optimal concentrations and ratio of carbonate to bicarbonate depends upon several factors, including the nature and concentration of the polymer that will be crosslinked, the nature and concentration of other additives in the fluid (for example biocides, iron control agents, surfactants, clay control agents, breakers, and other common oilfield chemical additives—some of which may inherently be buffers, acids, or bases) the desired delay time (typically related to the depth of the well and the pump rate), the temperature at which the crosslinking will occur, the final temperature which the fluid will reach, and the time for which the fluid must be stable (typically defined as having a viscosity above a certain level, for example 100 cP at 100 sec$^{-1}$). The optimal concentrations and ratio of carbonate to bicarbonate for a given use may be determined by simple experiments such as those described in the experimental section below.

The crosslinker system concentrate may be made, as an example by mixing of a suitable zirconium source and suitable sources of carbonate and bicarbonate. The chemistry of these systems has been discussed by A. Veyland, et al, "Aqueous Chemistry of Zirconium(IV) in Carbonate Media," Helvetica Chimica Acta, 83, 414-427 (2000). Potassium salts may be more soluble. Examples of suitable zirconium sources are zirconium oxychloride ($ZrOCl_2$, usually as the octahydrate as a solid, also called zirconyl chloride, basic zirconium chloride, dichlorooxozirconium, and zirconium dichloride oxide), ammonium zirconium carbonate, sodium zirconium carbonate, potassium zirconium carbonate, and mixtures thereof. Examples of suitable carbonate and bicarbonate sources include ammonium, sodium, and potassium carbonate, bicarbonate and sesquicarbonate. All of these sources may be used as commercially available (solids, hydrates, liquids, or solutions). Any suitable water source may be used; water containing high salt concentrations, multivalent cations, or ligands for zirconium should be tested before use. The components may be mixed in any order, but typically the concentrate is prepared by adding a zirconium compound to a carbonate/bicarbonate mixture or solution. The concentrate may optionally contain a component or components that lower the freezing point, for use in cold weather locations. Any suitable solvent may be used, provided that it does not affect the solubility of the components and the efficacy of the system. Examples include methanol, ethanol and propanol. Even with such anti-freeze components, the crosslinking system concentrate of the invention has a much higher zirconium concentration than prior art zirconium crosslinker concentrates.

The as-received zirconium source, carbonate source, and bicarbonate source, and optional materials such as alcohols, may be blended in any order either in the field or at a separate location. Alternatively, any combination of some of the components can be premixed on site or at a separate location and then another component or components may be added later. Standard mixing equipment and methods may be used; heating and special agitation are normally not necessary but may be used. The concentrate is used in the field just as any other crosslinker concentrate is used, except that normally a separate buffer and a separate delay agent are not needed, and so one or two less additive streams are required. However, if necessary as dictated by the specific job requirements and situation, a separate buffer and/or delay agent and/or accelerator may be added, either to the concentrate or to another additive stream or to the final fluid being prepared; the separate buffer and/or delay agent and/or accelerator may be carbonate and/or bicarbonate or another material, such as hydroxide. If the source of water for the final fluid contains materials that might affect the final fluid, for example carbonate and or bicarbonate, then a separate buffer and/or delay agent and/or accelerator may need to be added to compensate for this or the amount of separate buffer and/or delay agent and/or accelerator may need to be adjusted.

The amounts of zirconium, carbonate and bicarbonate in the concentrate are optimized for the job needs, as determined for example by the choice and concentration of polymer and the temperature of the oilfield treatment and the time the crosslinked gel must be stable. Simple laboratory experiments, such as those in the experimental section below, are run to optimize the performance. Normally, the composition is formulated to maximize the concentration of zirconium and to provide sufficient carbonate to buffer the final fluid (to minimize the viscosity decline seen at higher temperatures) and sufficient bicarbonate to delay the crosslinking. However, the relative amounts of carbonate and bicarbonate are also important. Higher carbonate concentrations in the final fluid decrease the delaying capability of the bicarbonate. Carbonate in excess of that required to buffer the final fluid may decrease fluid stability. Too high bicarbonate may result in undesirably long delay times.

The concentration of zirconium in the composition varies, and is determined by a number of factors including the fluid performance required, the stability of the complex in the concentrate in storage, the volume and the related cost of transportation, and the equipment available and the volumes required to be used in the application, particularly during continuous-mixing operations. As an example, the concentrate contains about 0.5 to about 15 weight percent zirconium, for example from about 5 to about 10 weight percent. The ratio of carbonate to zirconium in the composition is normally at least about 1:1 on a molar basis, for example up to about 8:1, for example between about 2:1 and about 4:1. If the composition includes bicarbonate, the ratio of bicarbonate to zirconium is from about 0.1:1 to about 8:1, for example from about 1:1 to about 4:1. The molar ratio of carbonate plus bicarbonate is greater than about 4 times the amount of zirconium, for example greater than about 8 times, for example greater than about 16 times. Note that the amount of carbonate and, optionally, bicarbonate, in the concentrate exceeds the amount that is complexed with the zirconium, that is not all of the carbonate or bicarbonate present in the composition is associated with zirconium ions; in addition, more may be liberated or consumed during reaction.

Suitable polymers (typically referred to as water soluble or hydratable) include polysaccharides composed of mannose and galactose sugars, such as locust bean gum, karaya gum, guar gums, or guar derivatives such as hydroxypropyl guar (HPG), hydroxyethyl guar (HEG), carboxymethyl guar (CMG), carboxymethylhydroxyethyl guar (CMHEG), carboxymethylhydroxypropyl guar (CMHPG), and hydrophobically modified guar. Cellulose derivatives such as hydroxyethylcellulose (HEC), hydroxypropylcellulose (HPC), and carboxymethylhydroxyethylcellulose (CMHEC) are also used. Xanthan, diutan, scleroglucan, polyvinylalcohol, polyacrylamide and polyacrylate polymers and copolymers are also suitable. Mixtures of any of these polymers may be used.

The present invention can be further understood from the following examples.

Linear (uncrosslinked) fluids were prepared for use in these experiments with the following standard components in the indicated amounts to form a "standard" linear fluid:

| | |
|---|---|
| Deionized water | 1000 ml |
| Slurriable CMHPG | 3 g |
| Acid Buffer | To pH 6.5-7.0 (approximately 0.6 ml) |
| Clay Stabilizer | 2 ml |
| Gel Stabilizer | 3 g |

The acid buffer was a solution of sodium diacetate. This is used to lower the pH of the solution during polymer hydration to improve or increase initial polymer hydration. This should not be confused with a second pH modifier that is typically used in association with the crosslinker, but is not present in this linear fluid. This second pH modifier is normally used to raise the pH of the fluid to facilitate crosslinking of the polymer and to stabilize the crosslinked polymer at higher temperatures. It is this second pH modifier that is replaced by the carbonate/bicarbonate portion of the crosslinker/pH modifier concentrate of the present invention. The clay stabilizer is TMAC (tetramethyl ammonium chloride). Others, such as KCl, may be used. The gel stabilizer is sodium thiosulfate pentahydrate. Others, such as tetraethylenepentamine or triethylamine, may be used. It is to be understood that if the choices and concentrations of these components were different, the results would be different.

The components above were mixed together in a Waring blender cup for 30 minutes under constant shear until the polymer had fully hydrated. Portions of this fluid were removed and crosslinker/pH modifier concentrate was added to change the fluid pH, crosslink the polymer and viscosify the fluid. Fluid was then quickly transferred to a Fann 50 viscometer to measure the viscosity.

Crosslinker/pH modifier concentrates were also prepared in deionized water by the dropwise addition of zirconyl chloride ($ZrOCl_2$) solution to a solution containing potassium carbonate and potassium bicarbonate.

Crosslinked fluids were prepared by mixing 100 ml of the linear fluid, as described above, in a 250 ml Waring blender cup, increasing the blender speed to create a vortex in the fluid and adding the crosslinker/pH modifier solution quickly into the side of the vortex. The blender was then allowed to stir in the case of vortex closure tests or was turned off after 1-2 seconds if the fluid was to be transferred to a Fann 50 viscometer.

EXAMPLE 1

Fluids were made by adding 3.4 ml/L of the following crosslinker/pH modifier concentrates to the linear fluid already described. The concentrate formulations are shown in Table 1.

TABLE 1

| | Formulation | | | |
|---|---|---|---|---|
| Component | A | B | C | D |
| $ZrOCl_2 \cdot 8H_2O$ (Zr Equivalents) | 1 | 1 | 1 | 1 |
| $K_2CO_3$ ($CO_3^{2-}$ Equivalents) | 2 | 3 | 5 | 4.5 |
| $KHCO_3$ ($HCO_3^-$ Equivalents) | 3 | 2 | 0 | 3 |

These concentrates each contained about 0.7 weight percent zirconium (they were 0.08 molar in zirconium). The fluids were evaluated at approximately 24° C. (75° F.). The performance of each crosslinker was evaluated by measurement of the vortex closure time, measurement of final fluid pH, visual appraisal of the fluid lip formed, the and the effect of heating the fluid in a microwave oven. (The lip test is a procedure in which a gel is poured very slowly from one container to another. The fluid demonstrates a "lip" if, when the pouring is stopped part way through and the initial container is slowly tipped back up, the fluid will climb back into the initial container because of its elasticity. This is a simple way to observe whether a fluid is viscoelastic ("has a lip" or "passes the lip test"), or is merely viscous (no lip). Viscoelastic fluids are much better at suspending solids, such as sand or proppant, than are merely viscous fluids having the same viscosity. If fluids did not crosslink quickly at ambient temperature they were heated in a microwave oven to see whether this would bring about crosslinking and to give a rough, qualitative, indication of how they would perform at higher temperatures.)

The performance of these fluids improved with increasing bicarbonate concentration in the crosslinker/pH modifier concentrate, although it is expected that at even higher bicarbonate concentrations the fluid performance may deteriorate, as will be shown later for the last crosslinker formulation in Table 3. For example, formulation A performed better than formulation B, which performed better than formulation C. However, the final fluid pH decreased from formulation C to formulation A; the low final fluid pH was believed to have negative implications for high temperature stability, so formulation B was chosen for further study. FIG. 1 shows the viscosity as a function of time at 121° C. (250° F.) for experiments in which three concentrations of formulation B were added to the standard linear fluid. The pH before and after each experiment is also given.

In these experiments, the higher the zirconium concentration in the final fluid the higher the viscosity and stability. It is important to note that the viscosity and stability of all three fluids were within an acceptable range for use in fracturing operations (i.e., greater than 100 cP at 100 sec$^{-1}$) for at least 2.5 hours. Note, however, that the pH's of all three had dropped after the experiments.

Performance in the bench top experiments also improved with increasing carbonate to zirconium ratio, possibly due to improved buffering capacity per equivalent of zirconium.

EXAMPLE 2

The fluids in Example 1 were non-delayed, and non-delayed systems typically exhibit better performance than would be expected for delayed fluids. Since zirconium-crosslinked fracturing fluids are usually delayed to minimize pumping pressure and prevent shear-induced fluid degradation, a method of delaying the crosslinking was investigated.

Formulation C was added at 5.4 ml/L (to make a final zirconium concentration of 40 ppm) to the base linear fluid containing sodium carbonate and/or sodium bicarbonate to study the effect on crosslink time. Fluid pH was measured before and after crosslinking, and the vortex closure time was also recorded, as shown in Table 2.

TABLE 2

| Linear Fluid Composition | pH before Crosslink | pH after Crosslink | Delay at 24° C. (75° F.) (seconds) |
|---|---|---|---|
| Linear fluid only | 7.03 | 9.96 | 4 |
| Linear + 200 ppm $HCO_3^-$ | 8.08 | 9.52 | >300 |
| Linear + 200 ppm $CO_3^{2-}$ | 10.51 | 10.43 | 5 |
| Linear + 200 ppm $HCO_3^-$ + 200 ppm $CO_3^{2-}$ | 9.90 | 10.04 | >300 |
| Linear + 200 ppm $HCO_3^-$ + NaOH to pH 9.90 | 9.89 | 10.05 | 64 |

Examination of the results above shows that although addition of formulation C to a CMHPG solution at pH 7 results in rapid crosslinking, the crosslinking is delayed by bicarbonate. Use of equal weights of carbonate and bicarbonate also results in a delayed crosslink, and pH is not the sole factor in determining the crosslink times of fluids containing carbonate/bicarbonate mixtures.

EXAMPLE 3

The fluids shown in Table 3 were prepared by the addition of potassium carbonate and potassium bicarbonate to a zirconium carbonate solution containing the equivalent of approximately 20 weight % $ZrO_2$. The final solutions (containing 5.0 weight percent zirconium) were more concentrated than those in Example 1, so that they could be added to the linear fluid at a realistic oilfield concentration of 1.00 ml/L.

TABLE 3

| Component | Formulation | | | | |
|---|---|---|---|---|---|
| | E | F | G | H | I |
| Zirconium carbonate solution (Zr Equivalents) | 1 | 1 | 1 | 1 | 1 |
| $K_2CO_3$ ($CO_3^{2-}$ Equivalents) | 1.25 | 2 | 2.5 | 3 | 3.75 |
| $KHCO_3$ ($HCO_3^-$ Equivalents) | 3.75 | 3 | 2.5 | 2 | 1.25 |

Figure 2:
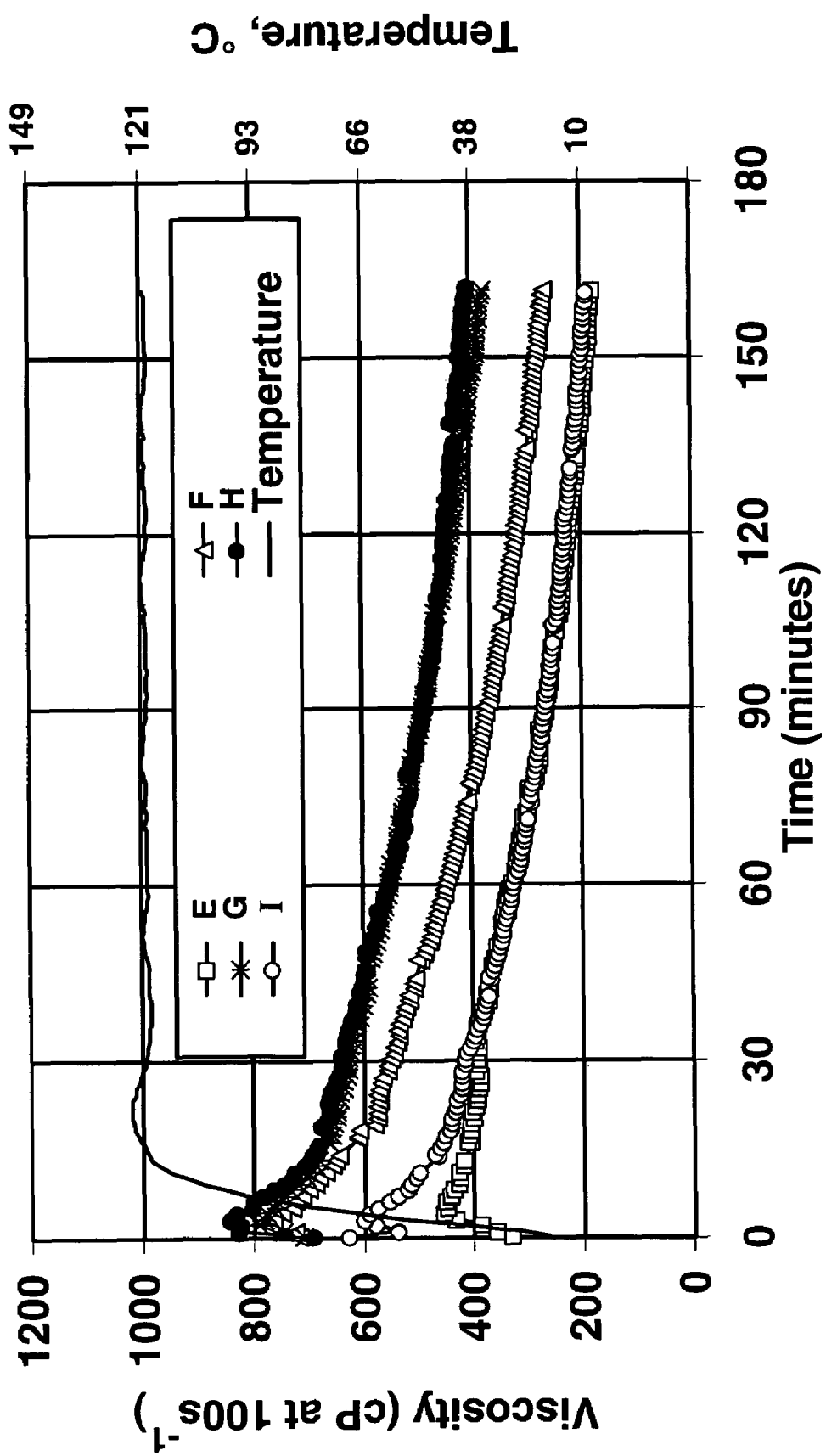
FIG. 2 shows the viscosity as a function of time at 121° C. (250° F.) for experiments in which various crosslinker/pH modifier concentrates were added to a standard linear fluid.

FIG. 2 shows the viscosity vs. time at 121° C. (250° F.) when 1 ml/L of each of these crosslinker/pH modifier concentrates was added. It can be seen that with all but formulation I there was a delay in the crosslinking (as compared, for example, to the experiments shown in FIG. 1; formulation I evidently did not have sufficient bicarbonate for this polymer, crosslinker, concentrations of the other components, and temperature. With increasing carbonate to bicarbonate ratio, at a constant sum of carbonate and bicarbonate, the stability of the final crosslinked fluid increased, until in formulation I there was apparently too much carbonate. The delay was most pronounced with the most bicarbonate (formulation E). All the fluids had the stability to be used in hydraulic fracturing.

Figure 3:
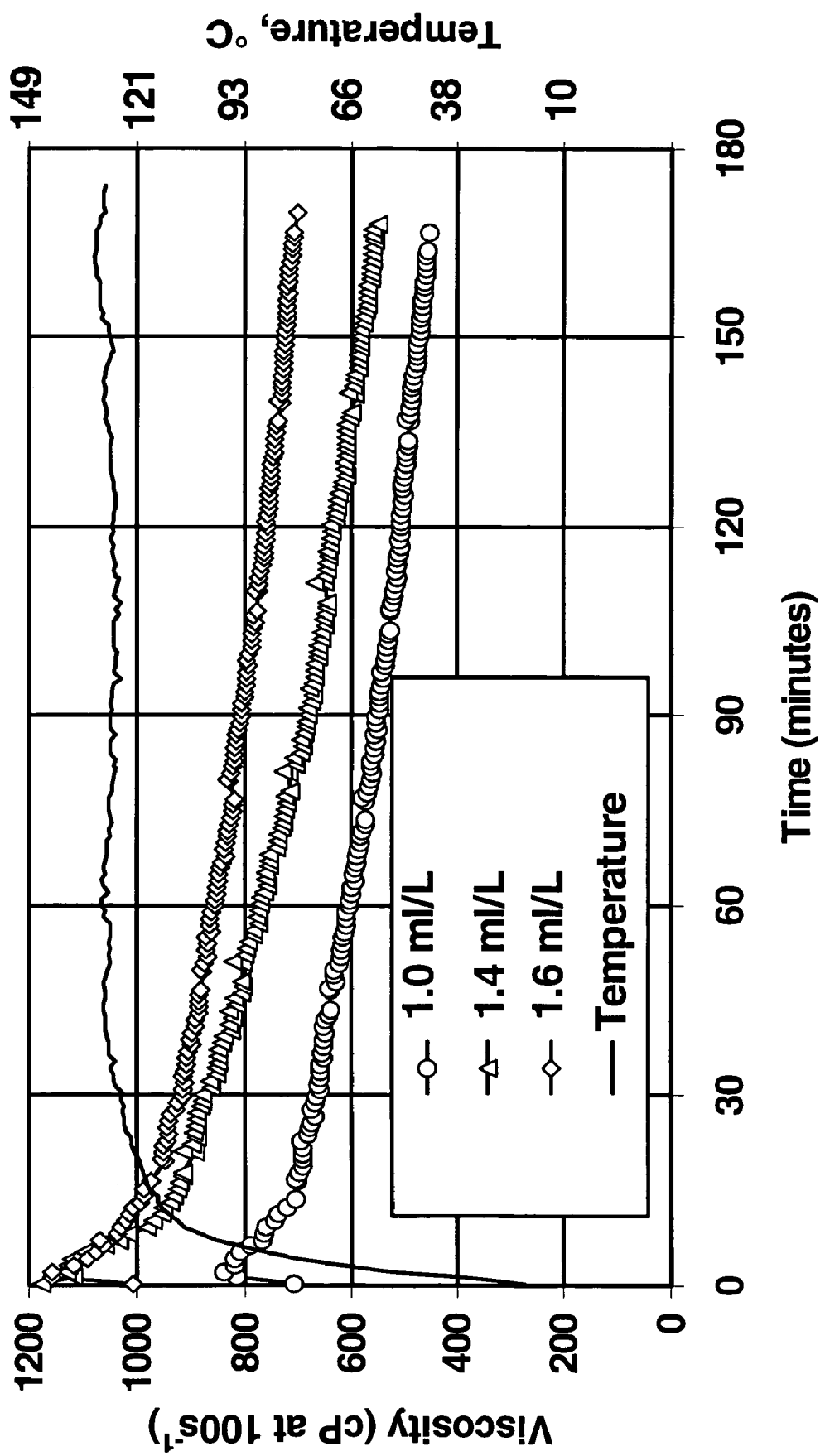
FIG. 3 shows the viscosity as a function of time at 130° C. (266° F.) for experiments in which three concentrations of a crosslinker/pH modifier concentrate were added to a standard linear fluid.

FIG. 3 shows the results at about 130° C. (266° F.) when various concentrations of formulation G were used. In these experiments, the greater the amount of the crosslinker/pH modifier concentrate used, the higher the crosslinked polymer fluid viscosity; however, it is expected that too high a concentration of crosslinker/pH modifier will result in syneresis and poor performance. In commercial practice, the operator chooses the lowest amount of zirconium that gives the desired viscosity.

Having thus described my invention, I claim:

1. A method of fracturing a subterranean formation penetrated by a wellbore comprising:
   a. providing a first fluid comprising water and a hydratable polysaccharide polymer crosslinkable with zirconium;
   b. providing a second fluid comprising water, carbonate in solution, bicarbonate in solution, and soluble zirconium (IV) having carbonate and bicarbonate as the only carbon-containing ligands complexed with zirconium;
   c. mixing said first and second fluids to form a mixed fluid; and
   d. injecting said mixed fluid into said formation;
   wherein content of zirconium(IV) in the mixed fluid is from about 0.5 weight percent to about 15 weight percent.

2. The method of claim 1 wherein mole ratio of carbonate to zirconium is at least about 3:1 and mole ratio of bicarbonate to zirconium is at least about 3:1.

3. The method of claim 2 wherein the mole ratio of carbonate to zirconium is at least about 5:1 and the mole ratio of bicarbonate to zirconium is at least about 5:1.

4. The method of claim 3 wherein the mole ratio of carbonate to zirconium is at least about 7:1 and the mole ratio of bicarbonate to zirconium is at least about 7:1.

5. The method of claim 1 wherein moles of carbonate plus moles of bicarbonate is greater than about 4 times moles of zirconium.

6. The method of claim 5 wherein the moles of carbonate plus the moles of bicarbonate is greater than about 10 times the moles of zirconium.

7. The method of claim 5 wherein the moles of carbonate plus the moles of bicarbonate is greater than about 15 times the moles of zirconium.

8. The method of claim 1 wherein mole ratio of bicarbonate to carbonate is at least about 1:2.

9. The method of claim 8 wherein the mole ratio of bicarbonate to carbonate is at least about 2:1.

10. The method of claim 1 wherein the ratio of carbonate to zirconium is from about 1:1 to about 8:1.

11. The method of claim 10 wherein the mole ratio of carbonate to zirconium is from about 2:1 to about 4:1.

12. The method of claim 1 wherein mole ratio of bicarbonate to zirconium is from about 0.1:1 to about 8:1.

13. The method of claim 12 wherein the mole ratio of bicarbonate to zirconium is from about 1:1 to about 4:1.

14. The method of claim 1 further comprising an alcohol.

15. The method of claim 14 wherein the alcohol is selected from methanol, ethanol and propanol.

16. The method of claim 1 wherein mole ratio of bicarbonate to carbonate is from about 1:4 to about 8:1.

17. The method of claim 1 wherein the content of zirconium is from about 5 weight percent to about 10 weight percent.

18. The method of claim 1 wherein ratio of bicarbonate to carbonate is adjusted by the addition of hydroxide.

19. A method of fracturing a subterranean formation penetrated by a wellbore comprising:
   a. providing a first fluid comprising water and a cellulose derivative based polymer crosslinkable with zirconium;
   b. providing a second fluid comprising water, carbonate in solution, bicarbonate in solution, and soluble zirconium (IV) having carbonate and bicarbonate as the only carbon-containing ligands complexed with zirconium;
   c. mixing said first and second fluids to form a mixed fluid; and
   d. injecting said mixed fluid into said formation;
wherein content of zirconium(IV) in the mixed fluid is from about 0.5 weight percent to about 15 weight percent.

20. A method of fracturing a subterranean formation penetrated by a wellbore comprising:
   a. providing a first fluid comprising water, and a diutan crosslinkable with zirconium;
   b. providing a second fluid comprising water, carbonate in solution, bicarbonate in solution, and soluble zirconium (IV) having carbonate and bicarbonate as the only carbon-containing ligands complexed with zirconium;
   c. mixing said first and second fluids to form a mixed fluid; and
   d. injecting said mixed fluid into said formation;
wherein content of zirconium(IV) in the mixed fluid is from about 0.5 weight percent to about 15 weight percent.

* * * * *